US011169260B2

(12) United States Patent
Goron et al.

(10) Patent No.: US 11,169,260 B2
(45) Date of Patent: Nov. 9, 2021

(54) METHOD FOR DETERMINING THE POSITION OF A MOBILE RADIO STATION BY MEANS OF A VEHICLE, AND VEHICLE

(71) Applicant: Continental Teves AG & Co. oHG, Frankfurt am Main (DE)

(72) Inventors: Gabriel Goron, Timisoara (RO); Michael Schulmeister, Groß-Zimmern (DE); Klaus Rink, Rodenbach (DE); Jonas Herzfeld, Hünxe (DE)

(73) Assignee: Continental Teves AG & Co. oHG

( * ) Notice: Subject to any disclaimer, the term of this patent is extended or adjusted under 35 U.S.C. 154(b) by 378 days.

(21) Appl. No.: 16/320,540

(22) PCT Filed: Jun. 28, 2017

(86) PCT No.: PCT/EP2017/065956
§ 371 (c)(1),
(2) Date: Jan. 25, 2019

(87) PCT Pub. No.: WO2018/024412
PCT Pub. Date: Feb. 8, 2018

(65) Prior Publication Data
US 2019/0235072 A1 Aug. 1, 2019

(30) Foreign Application Priority Data

Aug. 1, 2016 (EP) .................................. 16465522

(51) Int. Cl.
*G01S 13/931* (2020.01)
*G01S 13/74* (2006.01)

(52) U.S. Cl.
CPC ............ *G01S 13/931* (2013.01); *G01S 13/74* (2013.01); *G01S 2013/9316* (2020.01); *G01S 2013/9329* (2020.01)

(58) Field of Classification Search
CPC .......... G08G 1/16; G08G 1/161; G08G 1/166; G01S 3/02; G01S 5/0018; G01S 5/0072; G01S 5/0081; G01S 5/02; G01S 5/02213; G01S 5/0249; G01S 5/04; G01S 5/06;
(Continued)

(56) References Cited

U.S. PATENT DOCUMENTS 4,740,792 A * 4/1988 Sagey ................... G01S 5/0009
342/457
5,844,522 A * 12/1998 Sheffer ..................... G01S 5/04
342/457
(Continued)

FOREIGN PATENT DOCUMENTS

DE 102008026274 A1 12/2009
DE 202013006196 U1 10/2014

OTHER PUBLICATIONS

European Search Report for European Application No. 16 465 522.7, dated Jan. 18, 2018 with partial translation—11 pages.
(Continued)

*Primary Examiner* — Peter M Bythrow
(74) *Attorney, Agent, or Firm* — RatnerPrestia

(57) ABSTRACT

A method for determining the position of a mobile radio station by a vehicle, the method being based on a plurality of radio measurements. The invention further relates to a vehicle for carrying out such a method.

16 Claims, 1 Drawing Sheet

(58) Field of Classification Search
CPC ...... G01S 5/08; G01S 5/10; G01S 13/74–758; G01S 13/931
See application file for complete search history.

(56) References Cited

U.S. PATENT DOCUMENTS

| | | | |
|---|---|---|---|
| 5,983,161 A * | 11/1999 | Lemelson | G07C 5/0891 701/301 |
| 6,615,137 B2 * | 9/2003 | Lutter | G08G 1/0965 340/436 |
| 9,333,954 B2 * | 5/2016 | Schneider | G08G 1/166 |
| 9,718,405 B1 * | 8/2017 | Englander | B60R 1/00 |
| 10,082,562 B1 * | 9/2018 | Abari | G01S 13/343 |
| 10,757,485 B2 * | 8/2020 | Al-Stouhi | G07C 5/008 |
| 2001/0053699 A1 * | 12/2001 | McCrady | G01S 5/0221 455/513 |
| 2005/0073438 A1 * | 4/2005 | Rodgers | G08G 1/161 340/944 |
| 2005/0273258 A1 * | 12/2005 | MacNeille | G01S 5/0072 701/300 |
| 2007/0005609 A1 * | 1/2007 | Breed | B60N 2/2863 |
| 2008/0103696 A1 * | 5/2008 | Cheok | G01S 5/0284 701/300 |
| 2008/0234930 A1 * | 9/2008 | Cheok | G01S 5/0284 701/408 |
| 2009/0140887 A1 * | 6/2009 | Breed | G01S 17/86 340/990 |
| 2009/0149202 A1 * | 6/2009 | Hill | G01S 5/18 455/456.6 |
| 2010/0057361 A1 * | 3/2010 | Caveney | B60W 50/0097 701/301 |
| 2010/0198513 A1 * | 8/2010 | Zeng | G01S 17/931 701/300 |
| 2010/0273504 A1 * | 10/2010 | Bull | G01S 19/46 455/456.1 |
| 2013/0045759 A1 * | 2/2013 | Smith | G01S 5/0289 455/456.6 |
| 2016/0195600 A1 * | 7/2016 | Feldman | H04W 64/00 370/252 |
| 2018/0259353 A1 * | 9/2018 | Tsurumi | G01S 13/931 |

OTHER PUBLICATIONS

International Search Report and Written Opinion for Application No. PCT/EP2017/065956, dated Oct. 16, 2017—11 pages.

\* cited by examiner

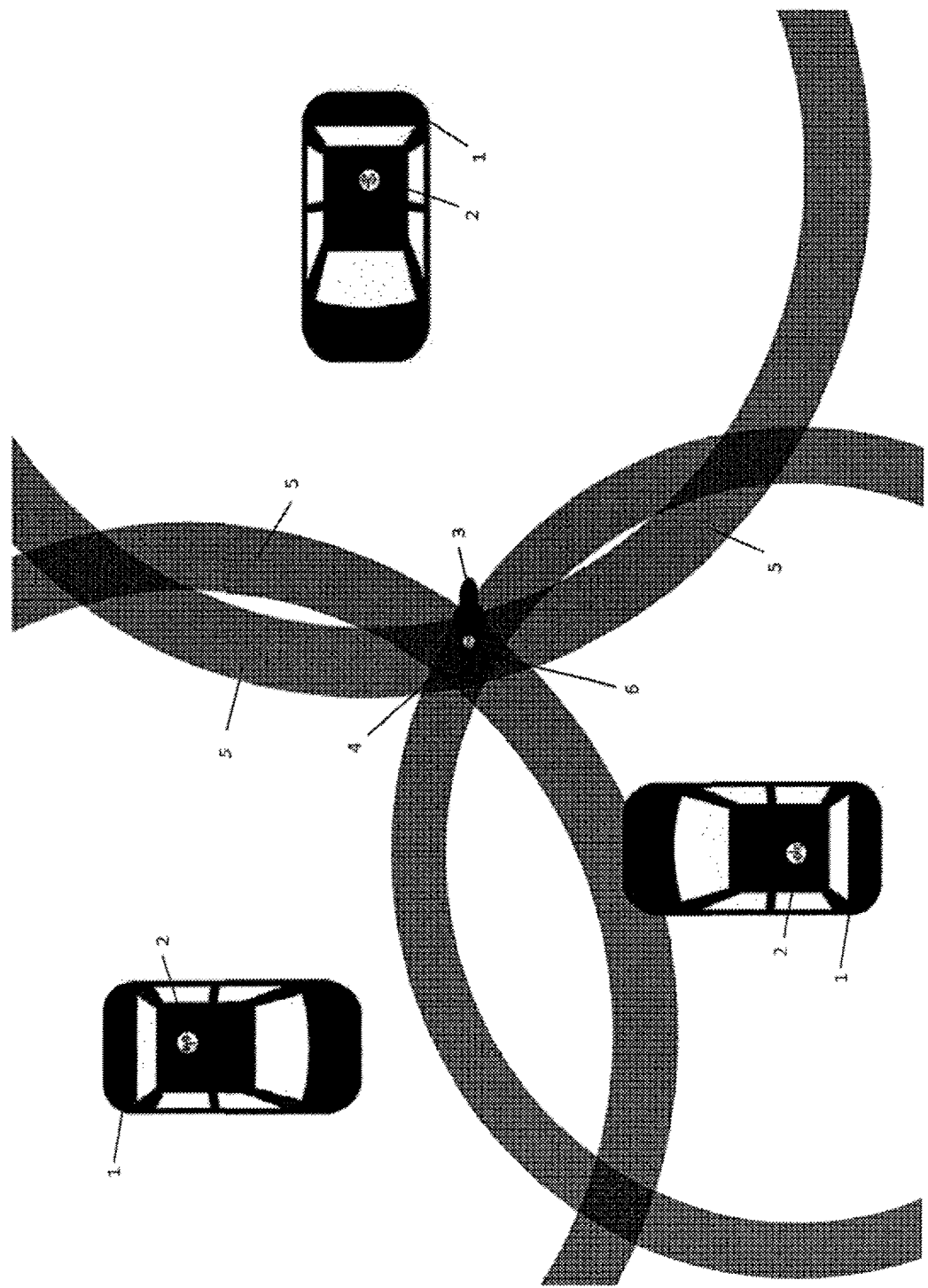

METHOD FOR DETERMINING THE POSITION OF A MOBILE RADIO STATION BY MEANS OF A VEHICLE, AND VEHICLE

CROSS REFERENCE TO RELATED APPLICATIONS

This application is the U.S. National Phase Application of PCT International Application No. PCT/EP2017/065956, filed Jun. 28, 2017, which claims priority to European Patent Application No. 16465522.7, filed Aug. 1, 2016, the contents of such applications being incorporated by reference herein.

FIELD OF THE INVENTION

The invention relates to a method for determining the position of a mobile radio station by a vehicle and to a vehicle which is configured to perform such a method.

BACKGROUND OF THE INVENTION

Recognizing and precisely locating vulnerable road users (VRU) is desirable in order to avoid accidents with them. Various approaches may in principle be considered for this purpose.

For example, objects such as pedestrians or other road users can be classified and located by algorithm using purely vehicle-based sensor systems such as radar, LIDAR or camera. This is, however, typically limited to the visible range. Concealed objects or VRUs typically cannot be located. Precisely in an urban setting, however, the number of situations involving concealed VRUs is very high.

A further possibility involves using cooperative radio systems with self-location of the vulnerable road user. This typically assumes that both the vulnerable road user and the vehicles in the traffic are equipped with compatible transmit and receive units. These can then be located using self-locating or remote-locating methods or transponders.

In self-locating methods, a unit, such as for example a mobile telephone, carried by a vulnerable road user determines its own position. This is frequently achieved in practice by means of a satellite navigation system (GNSS), radio network-based location finding (for example via UMTS, LTE or 5G) or by means of another, local, infrastructure-based location finding technology such as, for example, iBeacon. The position is then saved on a central server, typically by means of a mobile data link. The server likewise collects vehicle positions and can then warn vehicles and vulnerable road users as soon as a collision risk occurs. Such approaches are however as yet not sufficiently mature to be meaningfully used for avoiding accidents in road traffic.

In remote-locating methods, the position of a vulnerable road user's transponder is typically determined by bidirectional communication between a transponder carried in the vehicle and a transponder carried by the pedestrian. Position can be determined with an accuracy of less than one meter on the basis of the echo time (RToF=Round trip Time of Flight) and direction (AoA=Angle of Arrival) of the radio signal received at the vehicle. Existing systems, however, make use of proprietary radio protocols for this purpose, which complicates market penetration. The bandwidth available in the ISM band is moreover typically inadequate to distinguish reflected (multipath) signals from the direct signal at sufficiently high resolution. In particular for directional or angular information, no implementable technical solution is as yet available for automotive applications.

SUMMARY OF THE INVENTION

An aspect of the invention is a method for determining the position of a mobile radio station which is performed in an alternative, in particular better, manner in comparison with methods known from the prior art. Another object of the invention is that of providing a vehicle which can perform such a method.

An aspect of the invention relates to a method for determining the position of a mobile radio station by a vehicle which has the following steps:

carrying out a plurality of radio measurements between a plurality of radio base stations and the mobile radio station, wherein each radio measurement proceeds in each case between one of the radio base stations and the mobile radio station and wherein one of the radio base stations is the vehicle, and calculating the position based on the radio measurements.

The method according to an aspect of the invention makes it possible to determine the position of a mobile radio station in a cooperative method. For example, use may be made of a plurality of vehicles or also stationary radio stations such as for example infrastructure units or other objects, so that that shading effects can mostly be avoided. Location finding is moreover improved by its typically being possible to measure the radio station from a number of sides and from different angles, since a plurality of radio base stations are involved in carrying out the method.

It should be understood that a radio station is typically taken to mean a unit which a road user, in particular a vulnerable road user such as for example a pedestrian, a cyclist or a wheelchair user, carries with him/herself. It may be, for example, a mobile telephone, a transponder, a tag, a notebook, a tablet, a mobile hotspot or another unit with appropriate functionality.

A radio base station, in contrast, is taken to mean a station which is not the radio station itself but participates in ascertaining the position of the radio station via appropriate radio measurements. It is here in particular the vehicle itself which performs the method and furthermore also other vehicles or other mobile or stationary units. Greater details in this respect are provided below.

According to one embodiment, one, some or all of the radio measurements are based on a respective radio signal which is emitted by the mobile radio station and received by the respective radio base station. These are thus typically radio signals which are sent by the vulnerable road user themselves their radio station to vehicles or other radio base stations.

According to one embodiment, one, some or all of the radio measurements are based on a respective radio signal which is emitted by the respective radio base station and received by the mobile radio station. This corresponds to the reverse direction in comparison with the embodiment described in the previous paragraph.

It should be understood that the two embodiments just described can be combined with one another in any desired manner with regard to the direction of the radio signal. In principle, a respective radio base station can be used both for sending and for receiving a radio signal for carrying out a respective radio measurement.

According to one embodiment, one, some or all of the radio base stations which are not the vehicle are a respective further vehicle. According to one embodiment, one, some or all of the radio base stations which are not the vehicle are a respective stationary radio base station, in particular a respective traffic infrastructure unit. This may be, for example, a roadside unit. It should be understood that these embodiments can likewise be combined with one another in any desired manner, i.e. the method can be carried out jointly for example using two, three, four or more vehicles as radio base stations or also by means of this or a smaller or higher number of vehicles and any desired number of stationary radio base stations. All such combinations are deemed to be part of the disclosure of this application.

According to a preferred embodiment, at least three radio measurements are carried out. This corresponds to the procedure in trilateration, wherein it is typically possible to dispense with angle measurements. In the case of the radio measurements in particular, it is possible to measure only the respective distances between the respective radio base station and the mobile radio station. This can in particular be carried out by means of echo time measurement and/or by means of signal strength measurement. It is here advantageously possible to dispense with ascertaining angles, such that it is possible to dispense with installing corresponding antennas or sensor systems which are capable of measuring angles. This can save on sensors.

According to one embodiment, in one, some or all of the radio measurements, a respective distance between the respective radio base station and the mobile radio station is measured, wherein this can in particular proceed by means of echo time measurement and/or signal strength measurement. This can be combined in any desired manner with angle measurements. The position of a radio station is typically obtained for example from three distances, one angle and one distance, or from two angles. Redundant determination is, however, in principle also possible, such that previous results can be checked for plausibility or accuracy and reliability can be improved.

According to one embodiment, in one, some or all of the radio measurements, a respective angle between the respective radio base station and the mobile radio station is measured. Said angle can for example be used in the manner which has just been described.

All the radio base stations are preferably constructed separately from one another. As a consequence, the radio base stations can in particular measure the radio station from different angles.

The radio base stations preferably exchange data with one another for carrying out the method, in particular data relating to the radio measurements and/or relating to the position of the mobile radio station and/or relating to their own positions. The data necessary for carrying out the method can thus be exchanged, such that one vehicle or also all the vehicles or other radio base stations can in each case correspondingly determine the location of the radio station. The radio station can also in principle be included in this data exchange. Data can be exchanged for example by means of vehicle-to-X communication, by means of a mobile radio network or by means of other radio communication technologies.

Each of the radio base stations preferably determines its respective position. This can in particular proceed by means of satellite navigation or also by means of terrestrial radio networks. This is advantageous in particular in the case of mobile radio base stations since the respective position typically enters into the calculation of a position of the mobile radio station. It is also possible to provide that a respective radio base station is aware of its position. This can in particular be the case for stationary radio base stations. The position can here for example be permanently stored.

According to a further development, one, some or all of the radio base stations additionally carry out measurements by means of respective environment sensors, in particular by camera and/or radar and/or laser. The environment sensor measurements can be used during calculation of the position. Additional plausibility checking or an improvement in accuracy of identification can thus be achieved.

According to one further development, the method furthermore includes the following steps:
 determining whether there is a collision risk between the vehicle and the mobile radio station, and,
 in response to an identified collision risk, outputting a warning by carrying out a collision avoidance maneuver by the vehicle.

It is thus, in a particularly preferably manner, possible to respond automatically to an identified collision risk and, advantageously, to prevent a collision. A collision avoidance maneuver may for example be braking or swerving the vehicle. This can for example be carried out autonomously or automatically. It is, however, also possible to output an appropriate warning to the driver, instructing them to swerve or brake or in some other manner indicating the collision risk or the mobile radio station or the associated vulnerable road user.

An aspect of the invention further relates to a vehicle which is configured to perform a method according to an aspect of the invention. Use may here be made of all the described embodiments and variants.

An aspect of the invention further relates to a non-volatile computer-readable storage medium which contains program code, the execution of which causes a processor to perform a method according to an aspect of the invention. Use may be made of all the described embodiments and variants with regard to the method according to an aspect of the invention.

By means of the method according to an aspect of the invention, it is in particular possible also to identify concealed vulnerable road users who are not identifiable by existing environment sensor-based protective systems.

It can in general be stated that it is a possible aim to equip vehicles with cooperative sensors which, using a receive unit, are capable of determining a distance from a vulnerable road user or VRU. The problem of determining position sufficiently accurately can now be solved for example as follows. It is proposed that the vehicles equipped with cooperative sensor systems mutually assist one another in locating individual vulnerable road users. Vehicles, crossing vehicles, oncoming vehicles etc. can all determine distances from the individual vulnerable road users and exchange them with one another. Absolute positions can then be ascertained from the points of intersection. As a consequence, it is possible to determine the vehicle to which the vulnerable road user(s) is/are of relevance and which should accordingly take appropriate protective action. The protective action may for example be a collision avoidance maneuver. It would here also be particularly advantageous to include cooperative sensors which are mounted on infrastructure units (for example traffic lights, streetlamps etc.), since their position, which enters into the distance measurement, is a known, surveyed position, whereas the vehicles typically determine their position themselves, which is error-prone but nevertheless enters into the distance measurement in relation to the vulnerable road user.

Some advantageous characteristics of this approach are enumerated below.

The vulnerable road user is observed from various directions. This reduces the issue of the user possibly being concealed and radio location only functioning to a limited extent. This applies both to concealment by other objects such as vehicles, trees, houses and the like and to concealment by the vulnerable road user's own body which may for example attenuate the radio signal during location finding.

This approach furthermore makes it possible to reduce the frequency of inaccuracies due to multipath effects, since there is a higher probability of a line of sight.

Given the higher probability of line of sight, it is also possible to make use of environment sensors such as camera and radar over moderate distances to assist with location finding.

Distributed observation from a plurality of directions also makes it possible to identify a plurality of vulnerable road users.

Distributed observation from a plurality of directions furthermore permits precise location finding, since an angle of intersection of 90°, which is particularly advantageous for determining position, occurs statistically much more frequently.

Embodiments without angle measurement advantageously do not require a further antenna array for angle measurement by means of angle of arrival (AoA). Only radio technology can for example be used for distance measurement. It should, however, be understood that angles can also be measured or a plurality of radio technologies can be used for distance measurement.

The described method can also be used in a similar or identical manner for vehicle-to-vehicle location finding. This can for example mean that the above-mentioned radio station or mobile radio station is associated not with a typical vulnerable road user such as for example a pedestrian, but instead with a vehicle such as for example a motor vehicle.

It should furthermore be understood that the radio signals used can also be the radio signals normally used by a mobile telephone for communication with base stations of a mobile radio network. This can assist in avoiding the installation of additional applications or the emission of additional radio signals.

BRIEF DESCRIPTION OF THE DRAWINGS

A person skilled in the art will infer further features and advantages from the exemplary embodiment described below with reference to the appended drawings, in which:

The FIGURE shows an arrangement for carrying out an exemplary embodiment of the method according to an aspect of the invention.

DETAILED DESCRIPTION OF THE PREFERRED EMBODIMENTS

The FIGURE shows an arrangement of three vehicles for carrying out a possible embodiment of the method according to an aspect of the invention.

The vehicles are here in each case designated with reference numeral 1. The vehicle shown at the bottom left is the one which is performing the method according to an aspect of the invention together with the other two vehicles. The vehicles 1 can here in each case be understood to be radio base stations.

The two vehicles shown on the left in the FIGURE are driving as shown in opposite directions. The vehicle shown on the right in the FIGURE is driving leftwards at right angles thereto.

A vulnerable road user 3 in the form of a pedestrian is located between the three vehicles 1. The pedestrian is carrying a mobile radio station 4 in the form of a mobile telephone with them. The mobile radio station 4 is configured to participate in carrying out the method according to an aspect of the invention.

Each vehicle 1 has a respective radio communication unit 2 which participates in carrying out the method according to an aspect of the invention. In particular, the radio communication units 2 can communicate with one another and they can also communicate with the mobile radio station 4. In particular, they can determine their respective distance from the latter by echo time measurement.

This distance measurement gives rise to the three circular areas shown in the FIGURE and denoted with reference numeral 5. They are in each case based on a distance measurement in relation to one of the vehicles 1. It is to be assumed that the vulnerable road user 3 or their mobile radio station 4 is located in an intersecting area of these three areas designated with reference numeral 5. This intersecting area is designated with reference numeral 6.

Cooperative determination of the position of the vulnerable road user 3 by the three vehicles 1 makes it possible to determine their position very accurately and in the present case without requiring self-locating by the vulnerable road user 3. In the present case, it can for example be concluded from the ascertained position of the vulnerable road user 3 that the two vehicles 1 shown on the left in the FIGURE can continue to drive on without any problem, whereas a swerving maneuver is appropriate for the vehicle 1 shown on the right in the FIGURE and driving leftwards in order not to endanger the vulnerable road user 3.

In general, it should be noted that vehicle-to-X communication is in particular taken to mean direct communication between vehicles and/or between vehicles and infrastructure units. For example, it may thus be vehicle-to-vehicle communication or vehicle-to-infrastructure communication. If, in the context of this application, reference is made to communication between vehicles, this may in principle proceed for example in the context of vehicle-to-vehicle communication, which typically proceeds without mediation by a mobile radio network or a similar external infrastructure and which may therefore be distinguished from other solutions which are based for example on a mobile radio network. For example, vehicle-to-X communication may proceed on the basis of standards IEEE 802.11p or IEEE 1609.4. Vehicle-to-X communication may also be described as C2X communication. The sub-categories may be described as C2C (car-to-car) or C2I (car-to-infrastructure). However, an aspect of the invention explicitly does not rule out vehicle-to-X communication with mediation for example via a mobile radio network.

The stated steps of the method according to an aspect of the invention may be performed in the stated order. They may, however, also be performed in a different order. In one of the embodiments of the method according to an aspect of the invention, the method may for example be performed with a specific combination of steps in such a manner that no further steps are performed. Further steps may, however, in principle also be performed, including some which have not been mentioned.

The claims belonging to the application do not amount to a renouncement of achieving more extensive protection.

If it turns out, over the course of the procedure, that a feature or a group of features is not absolutely necessary, then the applicant already requests now a wording of at least one independent claim in which the feature or group of features is no longer included. This may for example be a sub-combination of a claim present at the filing date or a sub-combination limited by further features of a claim present at the filing date. Such claims or combinations of features which are to be reworded should be understood also to be covered by the disclosure of this application.

It should also be pointed out that configurations, features and variants of aspects of the invention, which are described in the various embodiments or exemplary embodiments and/or shown in the FIGURES, may be combined together as desired. Individual or multiple features are interchangeable as desired. Resultant combinations of features should be understood also to be covered by the disclosure of this application.

Back-references in dependent claims should not be understood to amount to renouncing independent objective protection for the features of the back-referenced subclaims. These features may also be combined as desired with other features.

Features which are only disclosed in the description or features which are disclosed in the description or in a claim only in conjunction with other features may in principle independently have significance which is essential to aspects of the invention. They may therefore also be included individually in claims for the purpose of differentiation from the prior art.

The invention claimed is:

1. A method for determining a position of a mobile radio station by a vehicle, the method comprising:
   computing:
      a first radio measurement between a first radio base station and the mobile radio station,
      a second radio measurement between a second radio base station and the mobile radio station,
      a third radio measurement between a third radio base station and the mobile radio station,
      wherein one of the first radio base station, the second radio base station, or the third radio base station is the vehicle, and
      wherein the first radio measurement, the second radio measurement, and the third radio measurement include round trip time of flight (RToF) or received signal strength (RSSI) of radio signals that are different from vehicle-to-X (V2X) messages;
   exchanging, via V2X messages, the first radio measurement, the second radio measurement, and the third radio measurement between the first radio base station, the second radio base station and the third radio base station;
   calculating, by the vehicle, the position of the mobile radio station on the basis of the first radio measurement, the second radio measurement, the third radio measurement and known positions of the first radio base station, the second radio base station and the third radio base station;
   determining, by the vehicle, whether there is a collision risk between the vehicle and the mobile radio station; and
   in response to an identified collision risk, outputting, by the vehicle, a warning, or carrying out a collision avoidance maneuver by the vehicle.

2. The method according to claim 1, wherein one, some or all of the first radio measurement, second radio measurement or third radio measurement are based on a respective radio signal which is emitted by the mobile radio station and received by the respective radio base station.

3. The method according to claim 1, wherein one, some or all of the first radio measurement, second radio measurement or third radio measurement are based on a respective radio signal which is emitted by the respective radio base station and received by the mobile radio station.

4. The method according to claim 1, wherein one, some or all of the radio first radio base station, second radio base station or third radio base station which are not the vehicle, are a respective further vehicle.

5. The method according to claim 1, wherein one, some or all of the first radio base station, second radio base station or third radio base station which are not the vehicle are a respective stationary traffic infrastructure unit.

6. The method according to claim 1, wherein, in the case of the first radio measurement, second radio measurement or third radio measurement, only the respective distances between the respective radio base station and the mobile radio station are measured.

7. The method according to claim 1, wherein, in one, some or all of the first radio measurement, second radio measurement or third radio measurement, a respective distance between the respective radio base station and the mobile radio station is measured.

8. The method according to claim 1, wherein, in one, some or all of the first radio measurement, second radio measurement or third radio measurement, a respective angle between the respective radio base station and the mobile radio station is measured.

9. The method according to claim 1, wherein all the first radio base station, second radio base station and third radio base station are separate from one another.

10. The method according to claim 1, wherein the data exchanged between the first radio base station, second radio base station or third radio base station for carrying out the method relate to the first radio measurement, second radio measurement or third radio measurement and/or the position of the mobile radio station and/or their own positions.

11. The method according to claim 1, wherein each of the first radio base station, second radio base station or third radio base station determines its respective position by satellite navigation, or is aware of its respective position.

12. The method according to claim 1, wherein one, some or all of the first radio base station, second radio base station or third radio base station additionally carry out measurements by respective environment sensors, and wherein the environment sensor measurements are used during calculation of the position.

13. A vehicle which is configured to perform a method according to claim 1.

14. The method according to claim 12, wherein the respective environment sensors are at least one of a camera, a radar, or a laser.

15. The method according to claim 1, wherein, in the case of the first radio measurement, second radio measurement or third radio measurement, only the respective distances between the respective radio base station and the mobile radio station are measured by echo time measurement or signal strength measurement.

16. The method according to claim 1, wherein, in one, some or all of the first radio measurement, second radio measurement or third radio measurement, a respective distance between the respective radio base station and the mobile radio station is measured by echo time measurement or signal strength measurement.

* * * * *